Aug. 29, 1950 — C. C. COONS — 2,520,530
ABSORPTION REFRIGERATION
Filed Aug. 31, 1946 — 4 Sheets-Sheet 4

INVENTOR.
Curtis C. Coons
BY Harry S. Demaree

Patented Aug. 29, 1950

2,520,530

UNITED STATES PATENT OFFICE 2,520,530

ABSORPTION REFRIGERATION

Curtis C. Coons, North Canton, Ohio, assignor to The Hoover Company, North Canton, Ohio, a corporation of Ohio Application August 31, 1946, Serial No. 694,370

27 Claims. (Cl. 62—119.5)

This invention relates to the art of refrigeration and more particularly to the art of absorption refrigerating machines utilizing an inert pressure equalizing medium.

It is a principal object of the present invention to provide an absorption refrigerating apparatus of the pressure equalizing type incorporating an evaporator which produces temperatures in a separate freezing compartment sufficiently low to maintain deep frozen foodstuffs.

It is a further object of the present invention to provide a refrigerating machine of the character immediately above described in which low temperatures are maintained in the freezing evaporator of the order of five degrees F. or lower by supplying the same with inert gas highly deconcentrated with respect to the refrigerant. Such deconcentration of inert gas is secured by passing the same through a special absorber maintained at a temperature approximating that of the food storage space of the refrigerator and supplied with a lean absorbing solution from the rectifier liquors of the refrigerating system proper.

It is a further object of the present invention to deconcentrate the inert gas for the low temperature evaporator in an absorber positioned at a relatively great elevation with respect to the generator and to supply absorbent material to that absorber without the aid of gas or vapor lift solution pumps.

It is a further object of the invention to provide a cooling unit structure of novel design in which a central insulated very low temperature chamber is flanked on its opposite lateral sides by ice freezing chambers and is provided with extended air-cooling surfaces on the rear wall thereof.

Other objects and advantages of the invention will become apparent as the description proceeds when taken in connection with accompanying drawings in which.

Figure 1:
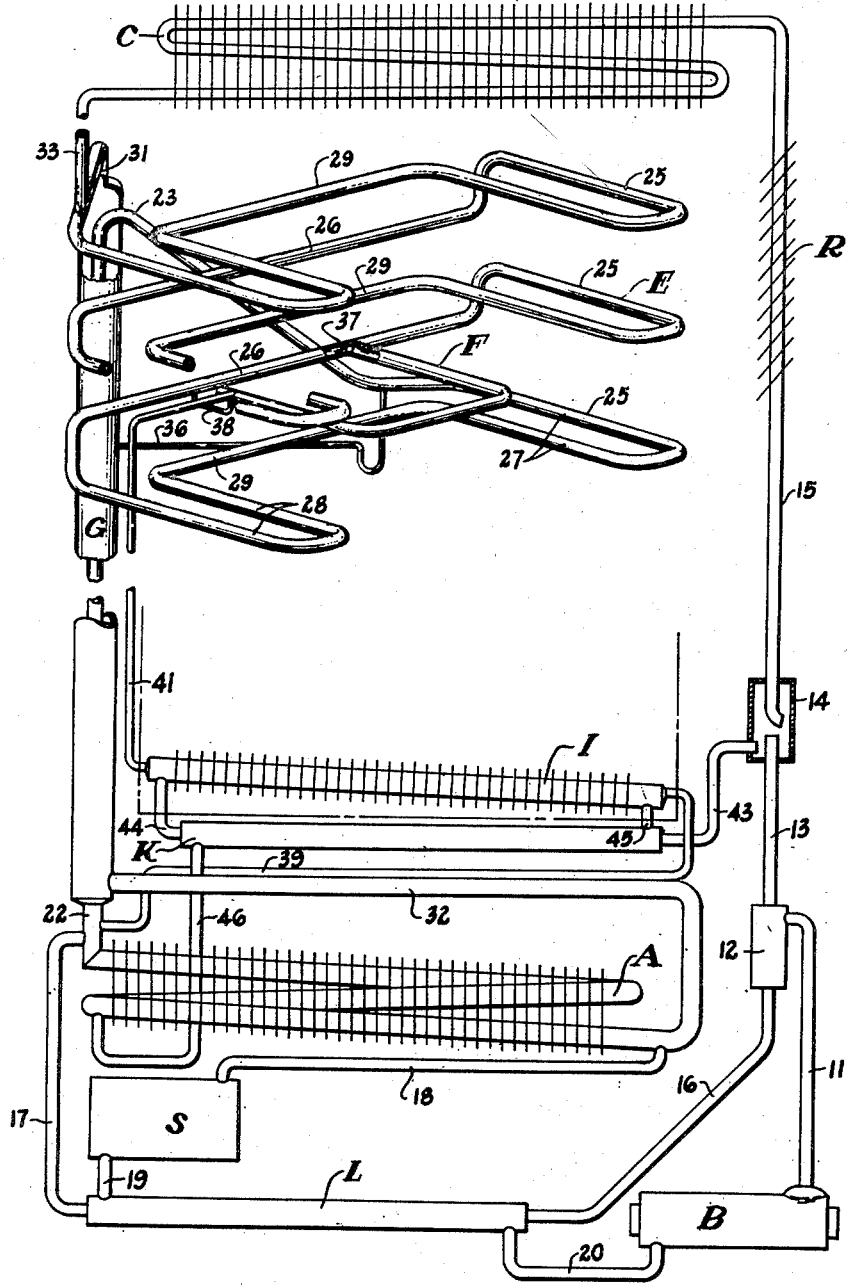
Figure 1 is a diagrammatic representation of an absorption refrigerating system embodying the present invention.

Referring now to the drawings in detail and first to Figure 1, there is illustrated a refrigerating apparatus comprising a boiler B, rectifier R, condenser C, primary evaporator E, low temperature freezing evaporator F, gas heat exchanger G, a tubular air-cooled absorber A, solution reservoir S, liquid heat exchanger L, a secondary air-cooled absorber I, and a secondary liquid heat exchanger K. The foregoing elements are connected by various conduits to be hereinafter described to form a complete refrigerating system including circuits for inert gas such as hydrogen, refrigerant such as ammonia, and absorbing solution such as water.

The boiler B is provided with a vapor lift pump 11 arising therefrom which discharges into a separation chamber 12 wherein the elevated absorbing solution is separated from the refrigerant vapor evolved in the boiler B. The separated vapor flows from chamber 12 through pipe 13, chamber 14, pipe 15, and rectifier R to the air-cooled condenser C.

The lean absorbing solution separated in chamber 12 from the refrigerant vapor flows therefrom by gravity through conduit 16, liquid heat exchanger L, and conduit 17 which discharges into the upper end of the absorber A. The solution flows downwardly by gravity through the absorber A in contact with a mixture of refrigerant vapor and inert gas. The solution absorbs refrigerant vapor from the gas to produce rich solution which is withdrawn from the bottom of the absorber A by the conduit 18 and conducted to the solution reservoir S. The enriched solution is then conducted from reservoir S to boiler B by conduit 19, liquid heat exchanger L, and conduit 20 thus completing the primary absorbing solution circuit.

The lean inert gas formed in the absorber is conveyed therefrom by conduit 22, the gas heat exchanger G, and conduit 23 to the bottom portion of the evaporator.

The evaporator E comprises a plurality of vertically spaced sinuous conduits 25 which are serially connected by riser and cross-connecting conduits 26 positioned at the rear of and between each pair of conduit sections 25.

Each of the conduit sections 25 comprises a pair of rearwardly facing U-shaped coplanar conduit elements 27 and 28 positioned on the right- and left-hand sides, respectively, of the evaporator as viewed in Figure 1. The sections 27 and 28 are serially connected by coplanar cross-connecting conduits 29.

Inert gas entering the evaporator through conduit 23 first flows through the elements 27 and 28, respectively, of the lower section 25, thence through the lowest connecting and riser conduit assembly 26, thence through the intermediate section 25, the upper riser and connecting assembly 26, and the upper conduit section 25 to the upper end of the evaporator proper. The inert gas in its travel through the evaporator picks up refrigerant vapor which is evolved therein to produce the refrigerating effect. The resulting enriched mixture of inert gas and refrigeratant vapor is discharged from the evaporator at the top thereof through conduit 31 and flows through the gas heat exchanger G and conduit 32 to the lower portion of the absorber A.

The refrigerant vapor supplied to the condenser C is liquefied therein and the resulting condensate flows into the evaporator through conduit 33 and conduit 31. The liquid refrigerant flows through the evaporator coils by gravity in counterflow relationship with the inert gas to produce the refrigerating effect hereinabove mentioned by evaporation of the liquid. Unevaporated materials which reach the bottom of the evaporator E are drained therefrom through the trap sealed conduit 36 to the outer pass of the gas heat exchanger from which point said liquids flow into the absorbing solution circuit.

The low temperature freezing evaporator F consists of a U-shaped conduit positioned in the vertical channel formed by the spaced elements 27 and 28 of the various evaporator sections 25. The evaporator conduit F has one end connected to the lower cross-connecting conduit 26 in order to discharge inert gas thereinto and to receive liquid refrigerant therefrom. A small dam 37 is provided in conduit 26 adjacent its point of connection with evaporator F and downstream with respect to the direction of refrigerant flow in order to force all liquid refrigerant reaching the lowermost conduit 26 to by-pass through the freezing evaporator F after which it is returned to the conduit 26 through the trap sealed conduit 38 and continues in its normal path of flow through the evaporator E.

A portion of the lean inert gas discharging from the absorber into conduit 22 is removed therefrom through conduit 39 which is in heat exchange relationship with the rich gas conduit 32. The gas flowing through conduit 39 discharges into the secondary absorber I which consists of a large conduit provided on its exterior surface with heat-rejecting fins as illustrated. In the absorber I the lean inert gas flows upwardly therethrough in counterflow relationship and in contact with a lean absorbing solution supplied from a source to be hereinafter identified. Since the air-cooled absorber I is positioned within the refrigerating compartment in the manner illustrated in Figure 3, it is maintained at a temperature approaching the temperature of that compartment and it is able to reduce the refrigerant vapor content of the lean inert gas to an extreme degree. Consequently, the inert gas which reaches the upper end of the absorber I is practically denuded of refrigerant vapor content. The stripped inert gas which reaches the upper end of the absorber I is conducted therefrom through conduit 41 to the liquid discharge end of the freezing evaporator F. The highly deconcentrated inert gas thus supplied to the evaporator F flows therethrough in contact with liquid refrigerant but in counterflow relationship therewith. Because of the low partial refrigerant vapor pressure in the inert gas, evaporation occurs at temperatures sufficient, five degrees F. and therebelow, to maintain deep frozen foodstuffs. The gas which is partially enriched in the freezing evaporator F then discharges into the lower cross-connecting conduit 26 of the evaporator E and from that point on flows in the circuit of the main stream of the inert gas.

This discharge of inert gas into evaporator E will not interfere with the operation thereof because the richest gas in evaporator F is comparatively lean by ordinary standards and such gas is capable of participating actively in the refrigerating process at the temperature levels at which evaporator E operates.

Condensate formed in the rectifier R drains through conduit 15 into vessel 14 from which point it is conveyed to the upper end of the absorber I by conduit 43, liquid heat exchanger K, and conduit 44. After passing through the absorber I the partially enriched and cold solution is conducted therefrom to the approximate mid-section of absorber A by conduit 45, liquid heat exchanger K, and conduit 46. The point of connection between conduit 46 and absorber A should preferably be arranged so that the solution in the absorber A and the solution from absorber I have approximately the same refrigerant vapor pressure.

The circulation of inert gas in both main and by-pass gas circuits is achieved by gravity due to the different densities of the cold rich gas discharging from the evaporator and the warmer lean inert gas discharging from the main and auxiliary absorbers.

The solution formed and discharged from an air-cooled rectifier in refrigeration systems of the type under consideration normally has a concentration approximating or slightly higher than the concentration of lean solution discharged from the boiler but it has a lower temperature and is cooled in the heat exchanger K to a temperature approaching the temperature prevailing in the food storage chamber of the refrigerator. This solution is able to produce extreme deconcentration of the inert gas stream flowing to the fast freezing evaporator because the partial pressure of ammonia vapor above the solution at the temperature levels prevailing in the food storage space of the refrigerator is extremely low compared to the partial pressure above a solution of equal concentration in an exterior air-cooled absorber which is maintained at a much higher temperature even under the most favorable conditions. The inert gas supplied to absorber I is lean as that term is customarily used in this art but the low partial pressure of the cold solution in the absorber I causes that solution to absorb further refrigerant vapor from the gas producing a stripped gas which is supplied to the evaporator F.

The foregoing system will be associated with and arranged in a cabinet similarly to the preferred form of the invention about to be described. The evaporator structure will be similar to that of Figures 4 and 5.

Referring now to Figures 2, 3, 4, and 5, a modified form of the invention is disclosed designed particularly for an apparatus of the type using nitrogen or other dense medium as the pressure equalizing substance and positive propulsion of the pressure equalizing medium.

Figure 2:
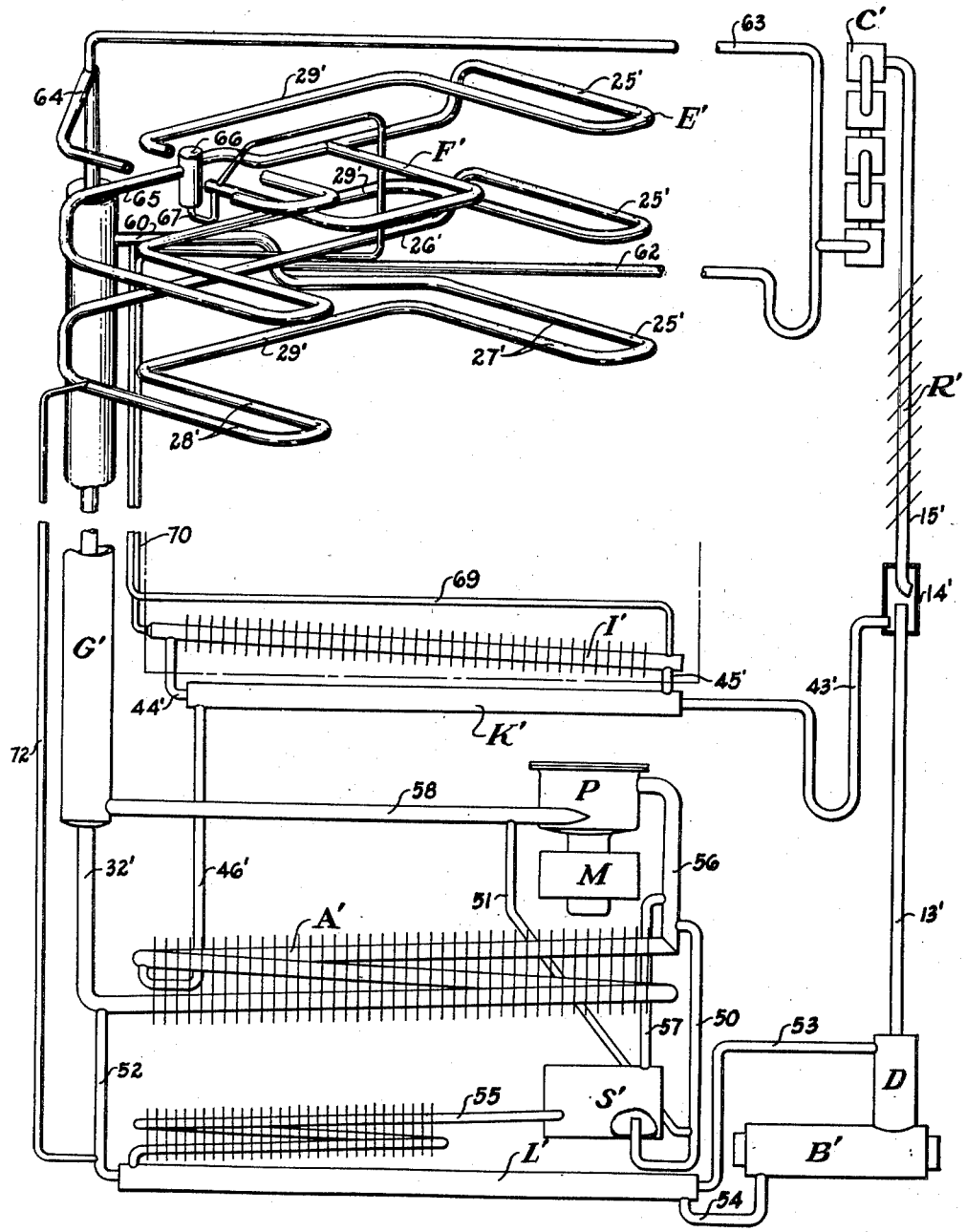
Figure 2 is a similar diagrammatic representation of a modified form of the invention.

Since a majority of the parts of the apparatus of Figures 2, 3, 4, and 5 are substantially identical with parts of the apparatus previously described in connection with Figure 1, identical parts are given the same reference characters in Figure 2 distinguished by a prime.

In addition to the elements common to Figures 1 and 2 the refrigeration system of Figure 2 also includes an analyzer D, an inert gas circulating pump P, and an electrical motor M which propels the pump P. Lean solution is conveyed from the boiler B' to the reservoir S' by means of conduit 54, liquid heat exchanger L', and the finned air-cooled conduit 55 in order to precool the lean solution additionally. The lean solution supplied to the reservoir S' is conveyed therefrom into the upper part of the absorber A' by a gas lift pump conduit 50 supplied with pumping gas by a conduit 51 in a manner to be hereinafter described. The lean solution flows downwardly through the absorber in contact with the inert gas refrigerant vapor mixture and the resulting enriched solution is conveyed from the bottom of the absorber to the top of the analyzer D by conduit 52, liquid heat exchanger L', and conduit 53.

The lean inert gas formed in the absorber is conveyed from the upper portion thereof to the suction inlet of the circulating pump P by conduit 56 to which is connected the vent conduit 57 for the solution reservoir S'. The inert gas is placed under pressure by the pump P and discharged therefrom into the conduit 58. A portion of the gas discharged into conduit 58 is removed therefrom through conduit 51 to operate the solution circulating gas lift pump 50.

The inert gas flowing through conduit 58 flows through the gas heat exchanger G' and enters the lowest convolution 27' of evaporator E' through conduit 60. In this form of the invention the inert gas flows upwardly through the evaporator E' at a velocity sufficient to distribute and elevate the liquid refrigerant throughout the evaporator coil as evaporation occurs.

The vapor evolved in the boiler B' passes through the analyzer D, conduit 13', separation chamber 14', conduit 15', and rectifier R' to the condenser C'. The condensate formed in the condenser C' is conveyed by the conduit 62 into the gas inlet conduit 60 of the evaporator. A conduit 63 connects between the condenser side of the trap in conduit 62 and the gas discharge pipe 64 of the evaporator to purge the condenser of non-condensable products and to subject the same to the low pressure prevailing on the gas discharge side of the evaporator E'.

The liquid refrigerant and inert gas flow successively through the two lower ice freezing sections 25' of evaporator E and then discharge therefrom into a conduit 65 which opens into a separation chamber 66. The chamber 66 is simply a gas velocity reducing and liquid separating device, the chamber of which may or may not be baffled, depending upon the exigencies of a particular design. The liquid separated in the chamber 66 is removed through the trapped conduit 67 into one end of the U-shaped low temperature freezing evaporator F'.

A portion of the inert gas flowing into conduit 60 from the gas heat exchanger G' is removed therefrom and conducted to the lower end of the secondary absorber I' by conduit 69. The inert gas flows upwardly through the absorber I' in counterflow relationship to and in contact with rectifier solution supplied through conduits 43', liquid heat exchanger K', and conduit 44' to the upper end of the absorber. This absorber is positioned within the food storage space of the refrigerator wherein it is maintained at a temperature approximating that of the food storage space, see Figure 3. Due to the low temperature at which the absorber I' is maintained and the lean solution supplied thereto the inert gas already reduced in refrigerant vapor content by its passage through the primary absorber A' is further stripped of refrigerant vapor producing an extremely low concentration of refrigerant vapor therein. The stripped gas flows through conduit 70 from the upper end of the absorber I' to the liquid inlet of the freezing evaporator F' wherein it flows in contact with the liquid refrigerant to produce temperatures sufficiently low to preserve deep frozen foodstuffs. The inert gas partially enriched in evaporator F' and any unevaporated liquid discharges therefrom into that portion of cross-connecting conduit 65 on the upstream side with respect to gas flow, of the separator 66 whereupon it flows through the normal inert gas circuit. The inert gas enriched in the evaporators E' and F' discharges from E' through conduit 64, gas heat exchanger G', and conduit 32' to the lower portion of absorber A'.

An overflow drain 72 is connected between the upper portion of the lowest evaporator section 25 and the strong solution discharge conduit 52 of the absorber.

In this form of the invention the inert gas, refrigerant, and solution are positively propelled through the medium of the inert gas circulating pump. The propulsion of the inert gas and refrigerant applies not only to the main circuit but also to the by-pass circuit which passes through the secondary absorber I' and the deep freeze evaporator structure F'. The secondary absorber I' and the deep freeze evaporator structure F with their appurtenant structures operate in the manner explained in connection with the device of Figure 1.

Figure 3:
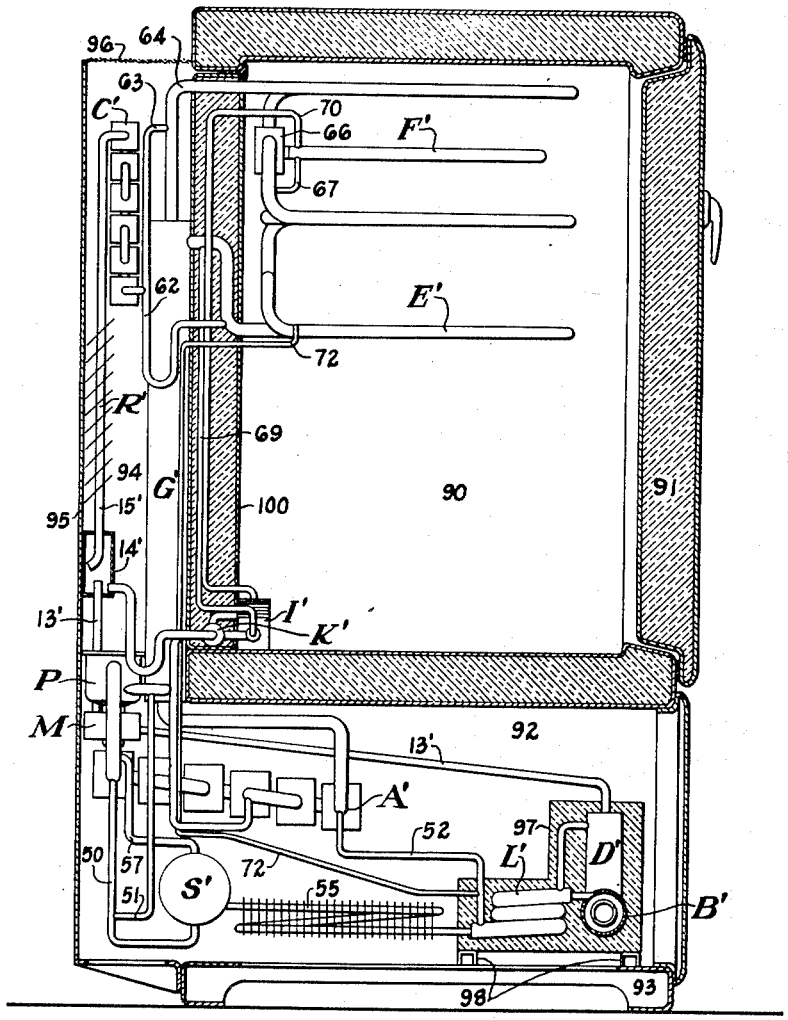
Figure 3 is a vertical sectional view of the apparatus of Figure 2 assembled in a refrigerating cabinet.
Figure 4:
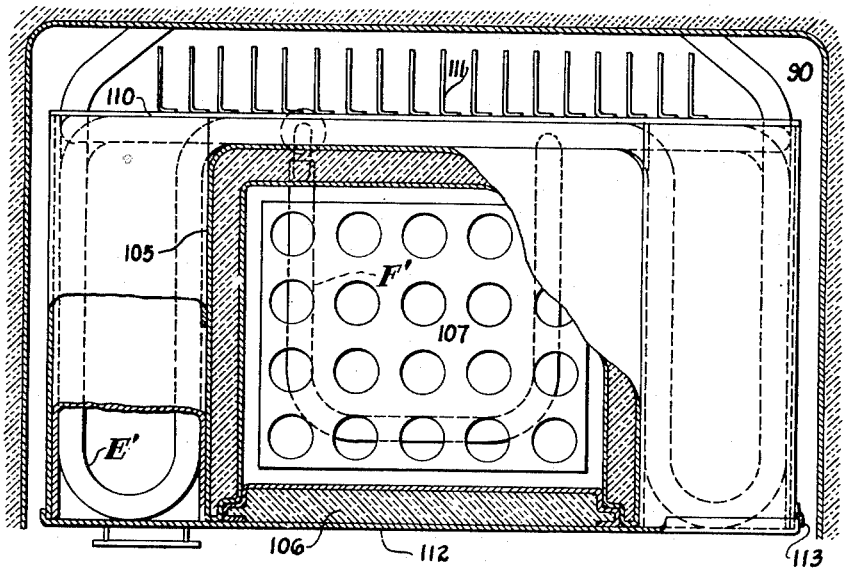
Figure 4 is a plan view partly in section of the evaporator structure of Figures 2 and 3.
Figure 5:
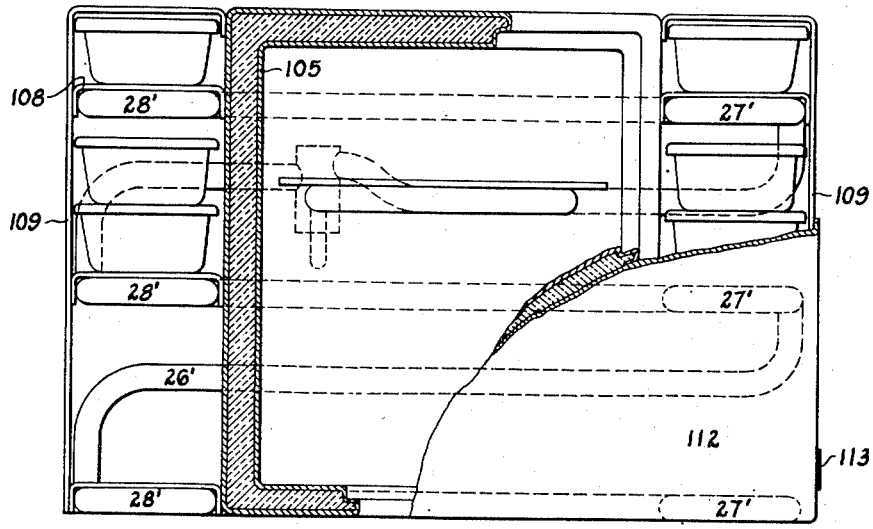
Figure 5 is an elevational view partly in section of the evaporator structure of Figure 4.

Referring now to Figure 3 the arrangement of the present invention with the cabinet is illustrated except that the details of the evaporator housing structure are omitted for clarity, these details being shown in Figures 4 and 5.

The cabinet structure consists of a plurality of insulated walls forming a refrigerating compartment 90 to which access is had by an insulated door structure 91. A mechanism compartment 92 is provided beneath the compartment 90 which is open at the bottom through the open frame foot structure 93 to permit cooling air to flow freely thereinto. Extending rearwardly and vertically along the rear wall of the cabinet structure there is an air flue 94 defined by a rear plate 95 having side wings, not shown, and covered at its top by a screen 96. It will be observed that cooling air may enter the bottom of the chamber 92 and flow therethrough and then vertically through the compartment 94 discharging through the screen 96.

The boiler B', analyzer D', and liquid heat exchanger L' are mounted at the front part of the chamber 92 in a heat insulating structure 97 which is supported upon cross-connecting channel arms 98 of the foot structure 93. Suitable supporting framework will be provided for the other portions of the apparatus but these are not shown for clarity, such apparatuses and constructions being well known.

The finned air-cooled conduit 55 is positioned at the rear central portion of the chamber 92 adjacent its bottom portion partially underlying the tubular air-cooled absorber A'. The absorber A' and conduit 55 are cooled by air flowing substantially vertically through the compartment 92.

The motor and pump unit, M and P respectively, is positioned in the bottom portion of the flue 94 where it joins the chamber 92 to be cooled by air flowing through said chamber. The air-cooled rectifier and condenser C are mounted in the central and top portions, respectively, of the chamber 94. As shown, the gas heat exchanger G' is also mounted in the air chamber 94 adjacent the rear wall of the cabinet structure.

The entire rear wall 100 of the chamber 90 is removable and is preferably assembled as part of the refrigerating system proper so that the entire structure, including the wall 100, may be inserted in the cabinet simply by a sliding movement forwardly from the rear thereof.

As shown in Figure 3 the evaporator structures E' and F" occupy the upper portion of the chamber 90 whereas the secondary absorber I' is positioned in the lower rear corner thereof so as to consume a minimum of otherwise usable space and also be in a position in which it will be cooled substantially to the temperature prevailing in the chamber 90 by the cold air falling downwardly from the evaporator structures. In this way maximum use is made of the refrigerating chamber with a minimum consumption of otherwise utilizable food storage capacity.

Referring now to Figures 4 and 6 the evaporator structures proper are illustrated in detail. The evaporator structure occupies substantially the full width and depth of the chamber 90 at the top portion thereof. The freezing coil F" is completely encased within an insulated compartment 105 having an insulated front access door 106. The coil structure F" is positioned about two-thirds of the way up from the bottom wall of insulated cabinet 105 and supports a perforated plate 107 which extends substantially throughout the internal cross-sectional area of the chamber 105. This plate forms a supporting surface for quick frozen foodstuffs and the perforations allow sufficient air circulation within the insulated housing 105 to assure thermal conditions which will preserve foodstuffs in all parts thereof. As shown in the figure, the inner and outer liners for the cabinet 105 are continuous. It will be understood, however, that breaker strips may be provided between these elements in a conventional manner.

Supporting shelves 108 overlie and are supported upon the evaporator convolutions 27' and 28'. Shelves 108 abut the outer side wall of the insulated housing 105 and are secured at their outer ends to metallic side wall plates 109 which form the outer side surfaces of the evaporator housing structure. A metallic heat conducting plate 110 extends across the rear of the whole evaporator structure and is connected at its ends to the rear edges of the vertical side wall plates 109. Air-cooling fins 111 are secured to the outer face of the plate 110 to provide a large air-cooling surface on the evaporator structure. The plate 110 is primarily refrigerated by the rear cross-connecting and riser conduits 29', 26', and 65 of the evaporator structure E' to which it may be thermally bonded in any suitable manenr. Additionally, the outer faces of the panels 109 also serve to refrigerate air within the chamber 90.

The entire front of the evaporator structure is covered by a door panel 112 which is hinged, as it is indicated at 113, on its right-hand edge as viewed in Figure 4. As herein shown the door 106 providing access to the fast freezing compartment 105 is mounted upon and formed integrally with the panel 112 which is uninsulated, however, where it faces the freezing evaporator housing structure. This is a convenient and simple construction, it is, however, within the purview of the invention to hinge door 106 upon a front edge of compartment 105 independently of door 112 so as not to open the compartment 105 when door 112 is opened merely to secure access to the ice trays. Alternately small doors may be provided for each of the lateral freezing chambers of the evaporator structures and door 106 hinged independently upon the freezing chamber structure 105.

In this form of the invention the analyzer D may be eliminated or substantially reduced in capacity as compared with comparable conventional systems. This departure from conventional practice is allowable because the rectifier liquors represent an active fluid in the system because of their use in the low temperature absorber. By reducing or eliminating the analyzing action a somewhat larger rectifier may be required but the solution supplied to the low temperature absorber is reduced in concentration because of the increased quantity of absorbent liquid condensed in the rectifier. Reducing the concentration of the rectifier liquor increases the ability of the low temperature absorber to strip the inert gas and hence promotes the efficiency of the low temperature part of the system.

In accordance with the present invention the temperature obtainable in the low temperature evaporator are closely related to the refrigerant vapor pressure conditions prevailing in the low temperature absorber. If extremely low temperatures are desired the requisite high degree of stripping of the inert gas can be obtained by still further reducing the refrigerant vapor content of the rectifier solution. Such low refrigerant vapor content in the rectifier liquors supplied to the low temperature absorber can be obtained by various methods such as by adjusting the heat rate to the boiler to vaporize a larger proportion of absorbent than usual practice dictates. This will increase the rectifier load and will produce an extremely lean absorbent to be supplied to the low temperature absorber.

The present invention provides a system by which lean absorbing solution is supplied to the low temperature absorber at a high elevation with respect to the generator without imposing additional load upon the absorbing solution circulating means. That is, absorbing material for the low temperature absorber travels from the level of the generator to a point above the low temperature absorber in vapor phase.

The foregoing forms of the invention represent preferred embodiments thereof which are particularly characterized by novel arrangement of freezing and ice making evaporators and the arrangements for supplying lean absorbing solution to the secondary absorber which is cooled by the air circulating within the main refrigerating compartment and ultimately by the evaporator of the principal refrigeration system, that is, the ice freezing and air-cooling evaporator structures.

While I have illustrated and described my invention in considerable detail, it is to be understood that the invention is not to be limited thereto but that changes and variations may be made without departing from the spirit thereof or the scope of the appended claims.

I claim:

1. In an absorption refrigerating apparatus of the pressure equalized type having an evaporator, an absorber, and a rectifier; a second evaporator, a second absorber arranged to be cooled by said first mentioned evaporator, means for conducting lean inert gas from said second absorber to said second evaporator, means for supplying refrigerant to said second evaporator and means for conducting condensate from said rectifier to said second absorber.

2. In combination with an absorption refrigerating apparatus of the pressure equalized type having an evaporator, an absorber, a generator and a rectifier; a low temperature evaporator, a second absorber arranged to be cooled by said first mentioned evaporator, means for conducting lean inert gas from said second absorber to said low temperature evaporator, means for conducting absorbing liquid from said rectifier to said second absorber, means for conducting liquid which has traversed said absorbers to said generator, and means for supplying refrigerant to said low temperature evaporator.

3. Absorption refrigerating apparatus comprising an evaporator and an absorber connected for circulation of inert gas, a generator connected to said absorber for circulation of absorbing solution, refrigerant liquefying means arranged to supply refrigerant liquid to said evaporator, a rectifier connected to receive vapor from said generator and to supply rectified vapor to said liquefying means, a low temperature evaporator, a second absorber arranged to be cooled by said first-mentioned evaporator, means for supplying absorbing liquid from said rectifier to said second absorber, means for conducting lean inert gas from said second absorber to said low temperature evaporator, and means for conducting absorbing liquid which has traversed said second absorber to a part of the apparatus containing absorbing solution.

4. In combination with an absorption refrigerating system of the pressure equalized type charged with a refrigerant, an absorbent and an inert gas and having an evaporator; an absorber and a rectifier; a low temperature refrigerating system including a low temperature absorber arranged to be cooled by said first mentioned evaporator, a low temperature evaporator arranged to receive refrigerant from said first-mentioned system, means for supplying said low temperature absorber with absorbing solution from said rectifier and for returning to said first-mentioned system absorbing solution which has traversed said low temperature absorber, means for supplying said low temperature absorber with inert gas which has traversed the absorber of said first-mentioned system, and means for supplying said low temperature evaporator with inert gas from said low temperature absorber and for returning it to said first-mentioned system inert gas which has traversed said low temperature evaporator and low temperature absorber.

5. Absorption refrigerating apparatus of the pressure equalized type including a cooling structure having a main evaporator and a low temperature evaporator, a low temperature absorber arranged to be cooled by said main evaporator and to supply lean inert gas to said low temperature evaporator, a main absorber connected to said main evaporator for circulation of inert gas therebetween, a generator, means for liquefying refrigerant vapor evolved in said generator and for supplying the liquefied refrigerant to said cooling structure, and means for independently supplying absorbent from said generator to said absorbers.

6. Absorption refrigerating apparatus of the pressure equalized type including a cooling structure having a main evaporator and a low temperature evaporator, a low temperature absorber arranged to be cooled by said main evaporator, a main absorber, means including a gas heat exchanger connecting said main absorber and said main evaporator to provide a circuit for inert gas, a generator, a rectifier, a condenser, means for conducting vapor from said generator to said rectifier and for conducting rectified vapor from said rectifier to said condenser, means for conducting refrigerant liquid from said condenser to said cooling structure, means for supplying absorbent from said generator to said main absorber, means for conducting absorbing liquid from said rectifier to said low temperature absorber, and means for flowing inert gas through said low temperature absorber and for flowing the inert gas which has traversed said low temperature absorber through said low temperature evaporator.

7. Absorption refrigerating apparatus comprising a means including an absorber, an evaporator and a gas propulsion means forming an inert gas circuit; a generator connected with said absorber to form an absorbing solution circuit; a condenser; a rectifier connected to receive vapor from said generator and to supply rectified vapor to said condenser; means for conducting refrigerant liquid from said condenser to said evaporator; said evaporator being so constructed and arranged that the refrigerant liquid is distributed therethrough by propelled inert gas; a low temperature evaporator, a second absorber arranged to be cooled by said first-mentioned evaporator, means for withdrawing propelled inert gas flowing from said absorber to said first mentioned evaporator and for conducting the withdrawn inert gas to said second absorber, means for conducting stripped inert gas from said second absorber to said low temperature evaporator, means for supplying condensate from said rectifier to said second absorber, means for conducting absorbing liquid which has traversed said second absorber to said absorbing solution circuit; gas and liquid separating means in said first mentioned evaporator intermediate the ends thereof; means for conducting refrigerant liquid from said gas and liquid separating means to said low temperature evaporator, said low temperature evaporator being connected to said first mentioned evaporator to discharge inert gas and refrigerant liquid which has traversed said low temperature evaporator into said first mentioned evaporator.

8. Refrigerating apparatus comprising a cabinet structure including an insulated refrigerating compartment, a cooling structure in said insulated refrigerating compartment including an insulated low temperature chamber, an ice freezing chamber arranged on each side of said low temperature chamber, an ice freezing evaporator having portions thereof arranged to refrigerate each of said ice freezing chambers and a low temperature evaporator arranged to refrigerate said low temperature chamber.

9. In an absorption refrigerating system a generator and an absorber connected for circulation of absorbing solution, means including an evaporator and said absorber forming a circuit for inert gas, a refrigerant liquefying means, a rectifier connected to receive vapors from said generator and to supply rectified vapor to said liquefying means, means for supplying refrigerant liquid to said evaporator from said liquefying means, a low temperature evaporator, a second absorber arranged to be cooled by said first-mentioned evaporator, means for supplying absorbing liquid from said rectifier to said second absorber, means for conducting absorbing liquid which has traversed said second absorber to a portion of the system containing absorbing solution, means for flowing inert gas having a lower refrigerant vapor content than the maximum refrigerant vapor content of the inert gas in said inert gas circuit to said second absorber, and means for flowing stripped inert gas from said second absorber to said low temperature evaporator and means for supplying refrigerant liquid to said low temperature evaporator.

10. In an absorption refrigerating system a generator and an absorber connected for circulation of absorbing solution, means including an evaporator and said absorber forming a circuit for inert gas, a refrigerant liquefying means, a rectifier connected to receive vapors from said generator and to supply rectified vapor to said liquefying means, means for supplying refrigerant liquid to said evaporator from said liquefying means, a low temperature evaporator, a second absorber arranged to be cooled by said first-mentioned evaporator, means for supplying absorbing liquid from said rectifier to said second absorber, means for conducting absorbing liquid which has traversed said second absorber to a portion of the system containing absorbing solution, means for removing a portion of the inert gas flowing toward said first mentioned evaporator in said inert gas circuit and supplying such removed inert gas to said second absorber, means for conducting stripped inert gas from said second absorber to said low temperature evaporator, means for supplying refrigerant liquid to said low temperature evaporator and means for flowing inert gas which has traversed said low temperature evaporator into said inert gas circuit at a point such that inert gas which has traversed said low temperature evaporator must traverse said first mentioned absorber before reaching the point at which inert gas is removed from said inert gas circuit.

11. Refrigerating apparatus comprising a cabinet structure including an insulated refrigerating chamber and a mechanism chamber, an absorption refrigerating apparatus of the pressure equalized type associated with said cabinet structure including an evaporator in said refrigerating chamber and a rectifier and an absorber in said mechanism chamber, a low temperature evaporator in said refrigerating chamber, a second absorber comprising a conduit provided with heat dissipating means on the exterior surface thereof mounted in said refrigerating chamber in position to be cooled by air circulating therein, means for supplying condensate from said rectifier to said second absorber, means for supplying refrigerant liquid to said low temperature evaporator, means for supplying inert gas to said second absorber, and means for supplying stripped inert gas to said low temperature evaporator from said second absorber.

12. Refrigerating apparatus comprising a cabinet structure having an insulated refrigerating compartment, a low temperature compartment positioned within said insulated refrigerating compartment, an absorption refrigerating system associated with said cabinet structure having an evaporator arranged to refrigerate said refrigerating compartment, a low temperature evaporator arranged to refrigerate said low temperature compartment, an absorber arranged to supply stripped inert gas to said low temperature evaporator and positioned in said cabinet structure to be refrigerated by air circulating in said refrigerating compartment, and means for supplying refrigerant liquid to said evaporators.

13. Refrigerating apparatus comprising a cabinet structure having an insulated refrigerating compartment, a low temperature compartment positioned within said insulated refrigerating compartment, an absorption refrigerating system of the pressure equalized type associated with said cabinet structure comprising a pair of laterally spaced evaporators positioned on opposite sides of said low temperature compartment, heat conducting housing structure enclosing said evaporators, a low temperature evaporator arranged to refrigerate said low temperature compartment, an absorber arranged to be cooled by air within said refrigerating compartment, means for conveying stripped inert gas from said absorber to said low temperature evaporator, and means for supplying refrigerant to said evaporators.

14. That improvement in the art of refrigeration which includes the steps of applying heat to a solution of refrigerant in an absorbent to liberate vapor of refrigerant and absorbent, condensing substantially all of said absorbent vapor without condensing a substantial quantity of refrigerant vapor in a first condensing zone to produce a lean absorbing solution, condensing the remainder of said vapor in a second condensing zone to produce refrigerant liquid, passing portions of said refrigerant liquid through first and second evaporating zones, passing an inert gas through a first absorbing zone in contact with solution from which vapor has been evolved by heating, rejecting the heat of absorption from said first absorbing zone to a cooling medium, passing part of the inert gas which has traversed said first absorbing zone through said first evaporating zone, passing the remainder of the inert gas which has traversed said first absorbing zone through a second absorbing zone in contact with absorbing solution condensed in said first condensing zone, rejecting the heat of absorption from said second absorbing zone to said first evaporating zone and passing inert gas which has traversed said second absorbing zone through said second evaporating zone.

15. An evaporator structure comprising a plurality of vertically spaced substantially horizontal pairs of cooling conduits, the elements of each pair being laterally spaced and serially connected by rear conduits, laterally spaced supporting shelves arranged to be refrigerated by the said elements, a casing structure surrounding said shelves and conduits, an insulated low temperature chamber positioned between the vertically spaced elements of said pairs, a cooling element for refrigerating said chamber, and cooling fins attached to a wall of said casing.

16. That method of producing refrigeration which includes the steps of applying heat to a solution of refrigerant in an absorbent to expel vapors therefrom, flowing solution from which vapors have been expelled through an absorbing zone in contact with an inert gas admixed with refrigerant vapor to absorb refrigerant vapor into the solution, condensing absorbent from the said expelled vapors, flowing such condensed absorbent through a second absorbing zone in contact with a portion of the inert gas and refrigerant vapor which has traversed said first mentioned absorbing zone to further reduce the refrigerant vapor content of said portion of said inert gas, liquefying the refrigerant vapors remaining after condensation of said absorbent vapors, flowing the said portion of said inert gas through a first evaporating zone in contact with a portion of the liquefied refrigerant to produce refrigeration at a first temperature, and flowing the remainder of said inert gas from said first absorbing zone through a second evaporating zone in contact with another portion of said liquefied refrigerant to produce refrigeration at a second temperature.

17. Absorption refrigerating apparatus of the pressure equalized type including a pair of evaporators, a pair of absorbers each arranged to supply inert gas to a separate one of said evaporators, a generator, means providing for circulation of absorbing liquid through a circuit including said generator and one of said absorbers, and means for liquefying vapors of absorbent expelled in said generator and for supplying such liquefied absorbent to the other of said absorbers.

18. Absorption refrigerating apparatus of the pressure equalized type including a pair of evaporators, a pair of absorbers, a generator, means arranged to supply absorbing media to said absorbers and to conduct such media enriched by refrigerant absorbed in said absorbers to said generator, means for conducting inert gas and admixed refrigerant vapor from one of said evaporators to one of said absorbers, means for conducting a portion of the inert gas which has had its refrigerant content reduced in said one absorber to said one evaporator, means for conducting another portion of the inert gas which has had its refrigerant content reduced in said one absorber through the other of said absorbers to effect a further reduction in its refrigerant content and thence to the other of said evaporators.

19. Multi-temperature refrigerating apparatus of the absorption type comprising a pair of evaporators, a pair of absorbers, a generator, means for conducting absorbent from said generator to said absorbers separately, means for conducting inert gas from each of said absorbers to separate ones of said evaporators, means for liquefying refrigerant evolved from solution in said generator and for supplying the liquefied refrigerant to one of said evaporators, means for removing cold refrigerant liquid from said one evaporator and for supplying the same to the other of said evaporators.

20. Multi-temperature refrigerating apparatus of the absorption type comprising a pair of evaporators, a pair of absorbers, a generator, means for conducting absorbent from said generator to said absorbers separately, means for conducting inert gas from one of said evaporators to one of said absorbers, means for conducting a portion of the inert gas which has had its refrigerant content reduced in said one absorber to said one evaporator, means for conducting another portion of the inert gas which has had its refrigerant content reduced in said one absorber to the other of said absorbers wherein its refrigerant content is further reduced and thence to the other of said evaporators, means for liquefying refrigerant vapor evolved in said generator and for supplying refrigerant liquid to said one evaporator, and means for withdrawing cold refrigerant liquid from said one evaporator and introducing such cold liquid into said other evaporator.

21. Multi-temperature refrigerating apparatus of the absorption type comprising a pair of evaporators, a pair of absorbers, a generator, means for conducting absorbent from said generator to said absorbers separately, means for conducting inert gas from one of said evaporators to one of said absorbers, means for conducting a portion of the inert gas which has had its refrigerant content reduced in said one absorber to said one evaporator, means for conducting another portion of the inert gas which has had its refrigerant content reduced in said one absorber to the other of said absorbers wherein its refrigerant content is further reduced and thence to the other of said evaporators, means for liquefying refrigerant vapor evolved in said generator and for supplying refrigerant liquid to said one evaporator, means for withdrawing cold refrigerant liquid from said one evaporator and introducing such cold liquid into said other evaporator, and means for conducting liquid and inert gas which has traversed said other evaporator into said one evaporator.

22. Refrigerating apparatus comprising a cabinet structure including an insulated refrigerating compartment, a cooling structure in said insulated refrigerating compartment including an insulated low temperature chamber, an ice freezing chamber arranged on each side of said low temperature chamber, an ice freezing evaporator having portions thereof arranged to refrigerate each of said ice freezing chambers, a low temperature evaporator arranged to refrigerate said low temperature chamber, refrigerating apparatus positioned externally of said refrigerating chamber including liquid refrigerant supply means, an absorber, a second absorber positioned to reject its heat of absorption to a part of said cooling structure, means for conducting inert gas from said absorber to said ice freezing evaporator, means for conducting absorbent from said generator to said absorbers, means for conducting inert gas from said second absorber to said low temperature evaporator and means for conducting refrigerant liquid from said liquid refrigerant supply means to said cooling structure.

23. In an absorption refrigerating apparatus of the multi-temperature pressure equalized type, an evaporator structure comprising a pair of spaced apart freezing elements and a cooling element connecting said freezing elements, a low temperature evaporator positioned between said freezing elements and insulated from said evaporator structure; a generator, an absorber and a condenser arranged out of heat transfer relation with said evaporator structure, a second absorber arranged to reject heat of absorption to said cooling element, means for conveying inert gas from said absorber to said evaporator structure, means for conveying inert gas from said second absorber to said low temperature evaporator, means for conveying refrigerant liquid from said condenser to said evaporator structure, means for supplying absorbent to said absorbers, means for conveying cold refrigerant liquid which has traversed a part of said evaporator structure to said low temperature evaporator and for returning liquid to said evaporator structure which has traversed said low temperature evaporator.

24. In an absorption refrigerating apparatus of the pressure equalized type, an evaporator construction comprising a continuous conduit having inert gas inlet and outlet connections and a refrigerant inlet connection, said conduit being formed to provide a pair of spaced freezing elements, a low temperature evaporator positioned between said freezing elements, an inert gas inlet connection to said low temperature evaporator, means for conveying liquid from said conduit intermediate the ends thereof to said low temperature evaporator, and an inert gas outlet for said low temperature evaporator connected to discharge inert gas into said conduit.

25. Multi-temperature refrigerating apparatus of the pressure equalized type comprising a cabinet structure having an insulated refrigerating chamber and a mechanism compartment; a generator, an absorber and a condenser in said mechanism chamber; an evaporator structure in said refrigerating chamber comprising a conduit structure forming a pair of spaced freezing and air cooling units, a low temperature evaporator positioned between said spaced units and insulated therefrom and from the air in said refrigerating chamber; a second absorber arranged to reject its heat of absorption to said evaporator structure, means for conveying absorbing media from said generator to said absorbers, said condenser being connected to receive refrigerant vapor from said generator and to supply liquid refrigerant to said evaporator structure, means for conveying refrigerant liquid cooled in said evaporator structure to said low temperature evaporator, means for conveying one portion of the inert gas which has traversed said absorber to said evaporator structure and another portion of such inert gas to said second absorber and means for supplying inert gas stripped in said second absorber to said low temperature evaporator.

26. In a refrigerating apparatus an insulated refrigerating chamber, an insulated low temperature chamber within said insulated refrigerating chamber, an absorption refrigerating system having a first evaporator arranged to refrigerate said refrigerating chamber, a second evaporator arranged to refrigerate said low temperature chamber, a first absorber arranged to be cooled by air circulating in said refrigerating chamber, a second absorber arranged exteriorly of said chambers, generator means, liquefying means connected to receive refrigerant vapor from said generator means and to suply refrigerant liquid to said evaporators, said first and second absorbers being connected to supply inert gas of low refrigerant vapor content to said second and first evaporators respectively, and means for flowing absorbent in a circuit including said generator means and said absorbers.

27. In a refrigerating apparatus an insulated refrigerating chamber, an insulated low temperature chamber within said insulated refrigerating chamber, an absorption refrigerating system having a first evaporator arranged to refrigerate said refrigerating chamber, a second evaporator arranged to refrigerate said low temperature chamber, a first absorber arranged to be cooled by air circulating in said refrigerating chamber, a second absorber arranged exteriorly of said chambers, generator means, liquefying means connected to receive refrigerant vapor from said generator means and to supply refrigerant liquid to said evaporators, said first and second absorbers being connected to supply inert gas of low refrigerant vapor content to said second and first evaporators respectively, means for flowing absorbing solution enriched in refrigerant vapor content in said absorbers to said generator means, and means for supplying each of said absorbers with absorbent from which refrigerant has been evolved.

CURTIS C. COONS.

REFERENCES CITED

The following references are of record in the file of this patent:

UNITED STATES PATENTS

| Number | Name | Date |
|---|---|---|
| 1,711,553 | Von Platen et al. | May 7, 1929 |
| 1,757,578 | Lenning et al. | May 6, 1930 |
| 2,172,958 | Hainsworth | Sept. 12, 1939 |
| 2,207,125 | Kuebler | July 9, 1940 |
| 2,328,189 | Brace et al. | Aug. 31, 1943 |
| 2,330,913 | Philipp | Oct. 5, 1943 |
| 2,387,860 | Scullen | Oct. 30, 1945 |

FOREIGN PATENTS

| Number | Country | Date |
|---|---|---|
| 679,252 | France | Apr. 10, 1930 |